UNITED STATES PATENT OFFICE.

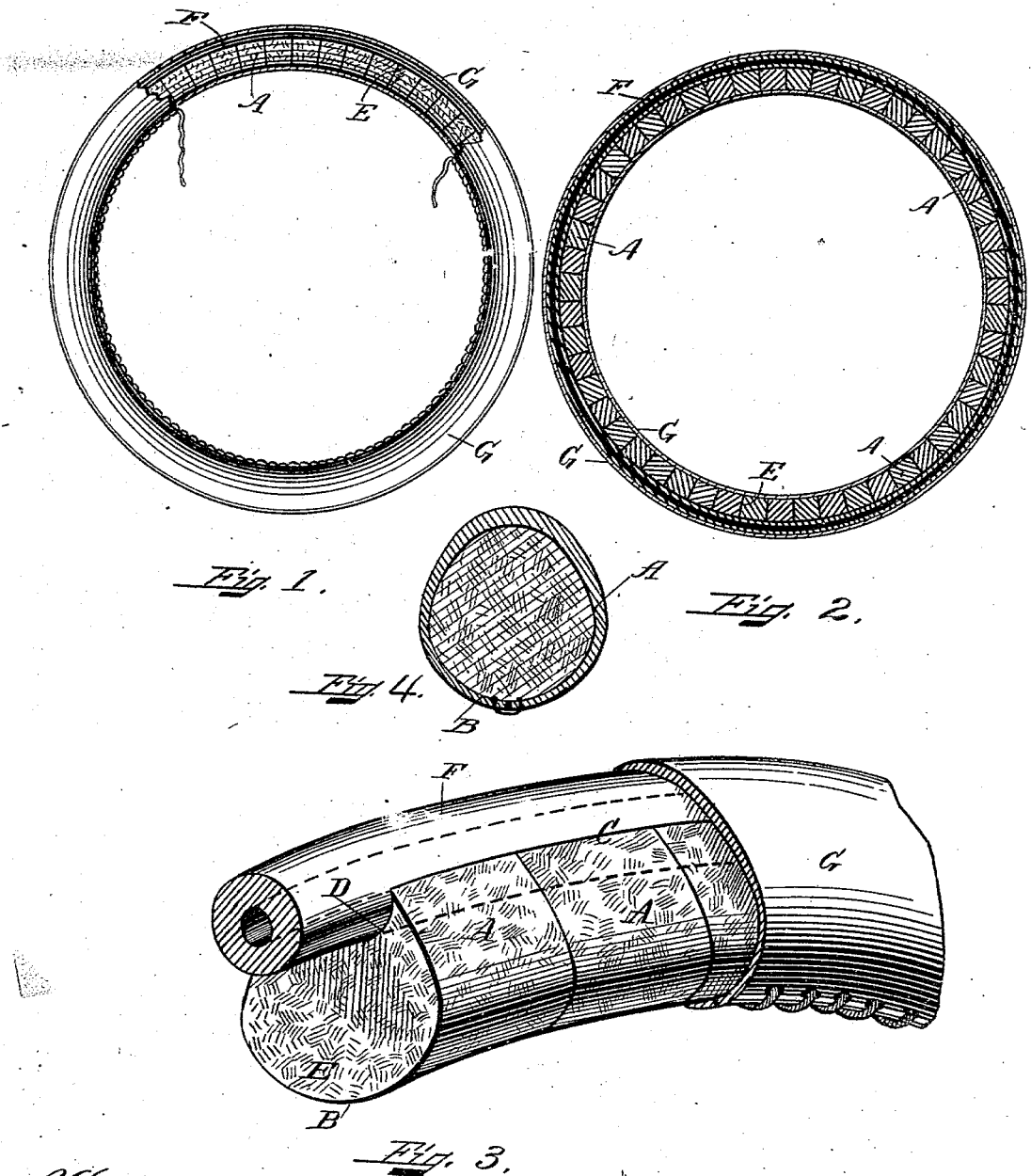

ISAAC BEST, OF LAWRENCE, MASSACHUSETTS.

TIRE FOR VELOCIPEDES.

SPECIFICATION forming part of Letters Patent No. 545,148, dated August 27, 1895.

Application filed January 17, 1895. Serial No. 535,220. (No model.)

*To all whom it may concern:*

Be it known that I, ISAAC BEST, a citizen of the United States, and a resident of Lawrence, in the county of Essex and State of Massachusetts, have invented a certain new and useful Improvement in Tires for Velocipedes and other Vehicles, of which the following, taken in connection with the accompanying drawings, is a specification.

The object of my invention is to produce a tire for velocipedes and other vehicles which combines durability, lightness, and resiliency without liability of collapse from accidents which would be fatal to tires embodying the principles of pneumatics.

To carry my invention into effect I proceed substantially as illustrated in the drawings forming a part of this specification, wherein—

Figure 1 is a side elevation of my improved tire with a portion of the outer envelope broken away to disclose the internal body construction. Fig. 2 is a vertical section thereof; Fig. 3, an enlarged view in perspective of a portion of the parts assembled. Fig. 4 designates a transverse section of the body and envelope.

Similar letters of reference designate corresponding parts throughout the views.

A represents the body, which is composed of sections of cork, in number depending upon the diameter of the wheel. Each section of cork has its inside circumference, as at B, semicircular or elliptical, or in any other manner fashioned to fit the metal or wooden wheel-rim with which it may be used. The outside circumference, as at C, has formed within it a semicircular depression or groove D, while the end surfaces E are each cut divergingly, or on a line from the center outwardly in a manner to admit of a circular shape when the several sections are assembled and secured by the outer endless tubing of rubber F, which is of sufficient circumference to compactly fill the groove D, and by its contractile power (through its diameter being slightly diminished from the groove D) to secure the assemblage of the several parts forming the body with some degree of stability until it is placed in or secured to the wheel-rim, in which form the outward tubing F forms the elastic cushion of the tire after it is organized, while in the absence of the part F the elastic cushion is compensated for by the increased thickening of the outer cover G, of rubber preferably, which is the confining envelope after assemblage, and which may be laced or cemented when ready for adjustment in the rim.

In the practical adaptation of my improved invention I desire not to confine myself to specific sizes or shape of the cork body as herein illustrated, as it may be advantageous to use longer and fewer sections, or, on the other hand, to employ a multiple of smaller sections, the exterior form of which obviously have different shapes to fit the conformations of diverse rim constructions, while in the absence of the groove the form of the several sections would be such as to fill the exterior covering, the idea mainly being to secure a light, separable, non-collapsible body in conveniently-shaped sections, each of which, to avoid rigidity, will have an independent lateral, vertical, and horizontal limited movement within its envelope or cover which it is designed to extend, as in the example of the cover G, Fig. 4, or to support the resillient structure F, as in Fig. 3.

Having ascertained the purpose and construction of my improved invention, I desire to secure by Letters Patent of the United States, and I claim—

A tire for velocipedes and other vehicles composed of independent sections of solid cork having ends divergingly cut to secure a circular form after assemblage, each of said sections provided within its longest periphery with a semi-circular groove adapted to receive and support a non-collapsing endless hollow tubing of rubber, in combination therewith the non-collapsing endless hollow tubing of rubber and the separable tubular outer covering of rubber adapted to be laced in position in a manner to maintain contact of the aforesaid cork body, and the hollow tubing substantially in the manner and for the purpose set forth.

In testimony whereof I have signed my name to this specification, in the presence of two subscribing witnesses, on this 10th day of January, A. D. 1895.

ISAAC BEST.

Witnesses:
JOHN R. POOR,
FRED. H. SCHAAKE.